(12) United States Patent
Layec

(10) Patent No.: US 9,954,639 B2
(45) Date of Patent: Apr. 24, 2018

(54) METHOD AND DEVICES FOR CONTROLLING SIGNAL TRANSMISSION DURING A CHANGE OF DATA RATE

(71) Applicant: Alcatel Lucent, Boulogne Billancourt (FR)

(72) Inventor: Patricia Layec, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 15/311,530

(22) PCT Filed: May 29, 2015

(86) PCT No.: PCT/EP2015/061930
§ 371 (c)(1),
(2) Date: Nov. 16, 2016

(87) PCT Pub. No.: WO2015/181345
PCT Pub. Date: Dec. 3, 2015

(65) Prior Publication Data
US 2017/0093520 A1 Mar. 30, 2017

(30) Foreign Application Priority Data
May 30, 2014 (EP) ................. 14305819

(51) Int. Cl.
*H04L 1/00* (2006.01)
*H04L 1/08* (2006.01)
(Continued)

(52) U.S. Cl.
CPC ............. *H04L 1/0002* (2013.01); *H04B 1/02* (2013.01); *H04B 1/06* (2013.01); *H04L 1/08* (2013.01)

(58) Field of Classification Search
USPC ......................... 370/329, 466, 477
See application file for complete search history.

(56) References Cited

U.S. PATENT DOCUMENTS

| 2002/0075897 A1* | 6/2002 | Koo ................. H04L 29/06 370/466 |
| 2004/0042465 A1* | 3/2004 | Lee ................... H04L 1/0061 370/395.52 |

(Continued)

FOREIGN PATENT DOCUMENTS

| EP | 1233564 | 8/2002 |
| EP | 1821416 | 8/2007 |

*Primary Examiner* — Eva Puente
(74) *Attorney, Agent, or Firm* — Patti & Malvone Law Group, LLC

(57) ABSTRACT

The present invention provides a method for controlling transmission of a signal between a transmitter and a receiver during a phase of change of a signal data rate. The method comprises, when the change is requested, informing the transmitter and receiver of a start of a transition phase. The transmitter retransmits the signal N times, with $N \geq 1$, in identical signal parts having a chosen length. The receiver stores the N retransmitted identical signal parts successively received to combine them together to produce a combined signal part, and to temporarily output these combined signal parts with an auxiliary data rate depending on N and on this signal part length. The transmitter and the receiver are informed of the end of the transition phase when the signal data rate change is finished.

9 Claims, 2 Drawing Sheets

(51) Int. Cl.
*H04B 1/02* (2006.01)
*H04B 1/06* (2006.01)

(56) References Cited

U.S. PATENT DOCUMENTS

| | | |
|---|---|---|
| 2008/0027717 A1 | 1/2008 | Rajendran et al. |
| 2012/0263107 A1 | 10/2012 | Hossein et al. |
| 2015/0131557 A1* | 5/2015 | Knutsen ............... H04L 1/0002 370/329 |
| 2017/0188385 A1* | 6/2017 | Abraham ............... H04L 5/003 |

* cited by examiner

METHOD AND DEVICES FOR CONTROLLING SIGNAL TRANSMISSION DURING A CHANGE OF DATA RATE

FIELD OF THE INVENTION

The present invention relates to signal transmission via communication networks, and more precisely to the change of signal data rate during a signal transmission.

BACKGROUND

The last generation of transceivers (i.e. communication equipments comprising a transmitter and a receiver) is capable of supporting multiple data rates either by changing the modulation format, or the coding rate or else the symbol rate of signals. This allows the transceiver to switch from one data rate to another one, not only between two signal transmissions or receptions but also during a signal transmission or reception.

As known by those skilled in the art, this last case requires the transceiver to adapt itself on the fly without losing any signal data, which means that the BER (Bit Error Rate) must be maintained below a given threshold. Such an adaptation requires an update of some of the digital signal processing (or DSP) software blocks into the receiver, which takes a transition time to reach a good convergence with a stable BER performance.

For instance, the change of symbol rate requires the update of DSP blocks such as the polarization demultiplexing and equalization (for instance employing the MMA (Multi-Modulus Algorithm)), the frame alignment and phase synchronization, and such a move takes a relatively long convergence time. MMA algorithms for instance implement stochastic gradient methods.

So, during a transition phase, i.e. before reaching convergence, the BER performance can be degraded and can fluctuate, but there is no known solution for overcoming these drawbacks.

SUMMARY

So an object of this invention is to improve the situation by increasing the reliability of a transceiver during a transition phase, for instance to allow the margin provisioned during a data rate change to be reduced.

In a first embodiment, a method is intended for controlling transmission of a signal between a transmitter and a receiver during a phase of change of signal data rate. This method comprises:

- a first step during which, when this change is requested, the transmitter and receiver are informed of a start of a transition phase,
- a second step during which the transmitter retransmits the signal N times, with N≥1, in identical signal parts having a chosen length, and the receiver stores these N retransmitted identical signal parts successively received to combine them together to produce a combined signal part, and to temporarily outputs these combined signal parts with an auxiliary data rate depending on N and on the signal part length, and
- a third step during which the transmitter and receiver are informed of an end of the transition phase when the signal data rate change is finished.

The method may include additional characteristics considered separately or combined, and notably:

- each one of the N retransmitted identical signal parts may be multiplied with a weighting coefficient, representative of a level of confidence of its retransmission, to generate a weighted signal part, and the N weighted identical signal parts may be added together to produce a combined signal part;
- in the first step the transmitter and receiver may be informed of a start of a transition phase once a guard time interval (that may be null) has passed after they received a corresponding change request;
- in the second step the transition phase may be divided into j (with j at least equal to two) successive sub phases $SP_j$ during each of which the transmitter retransmits the signal $N_j$ times, with $N_j \geq 1$, in identical signal parts having a chosen length $L_j$, and the receiver stores the $N_j$ retransmitted identical signal parts successively received to combine them together to produce a combined signal part, and to temporarily output the combined signal parts with an auxiliary data rate $R_{aj}$ depending on $N_j$ and on the signal part length $L_j$;
- in the second step, in the case where the signal data rate change consists in changing a first data rate with a second data rate greater than this first data rate, the auxiliary data rate may be comprised between these first and second data rates;
- in the second step, in the case where the signal data rate change consists in changing a first data rate with a second data rate smaller than this first data rate, the auxiliary data rate may be smaller than this second data rate.

In a second embodiment, a computer program product comprises a set of instructions arranged, when it is executed by processing means, for performing the method presented above to control transmission of a signal between a transmitter and a receiver during a phase of change of signal data rate.

In a third embodiment, a first device is intended for equipping a transmitter, and is arranged, after having been activated following upon a requested change of signal data rate during a transmission of signal by this transmitter to a receiver, for reproducing said signal N times, with N≥1, in identical signal parts having a chosen length, so that these N identical signal parts be successively transmitted by the transmitter to the receiver to be combined together to produce a combined signal part, and to temporarily output combined signal parts with an auxiliary data rate depending on N and on this signal part length In a fourth embodiment, a second device is intended for equipping a receiver and is arranged, after having been activated following upon a requested change of signal data rate during a transmission of signal by a transmitter to this receiver, for storing N retransmitted identical signal parts of this signal, having a chosen length and successively received by the receiver, to combine them together to produce a combined signal part, and to temporarily output the combined signal parts with an auxiliary data rate depending on N and on the signal part length.

In a fifth embodiment, a transceiver comprises a transmitter, comprising the first device presented above, and a receiver, comprising the second device presented above.

BRIEF DESCRIPTION OF THE FIGURES

Some embodiments of method and device in accordance with an embodiment of the present invention are now described, by way of example only, and with reference to the accompanying drawings, in which.

DESCRIPTION OF EMBODIMENTS

Hereafter is notably disclosed a method intended for controlling transmission of a signal between a transmitter 2 and a receiver 3 during a phase of change of signal data rate.

Figure 1:
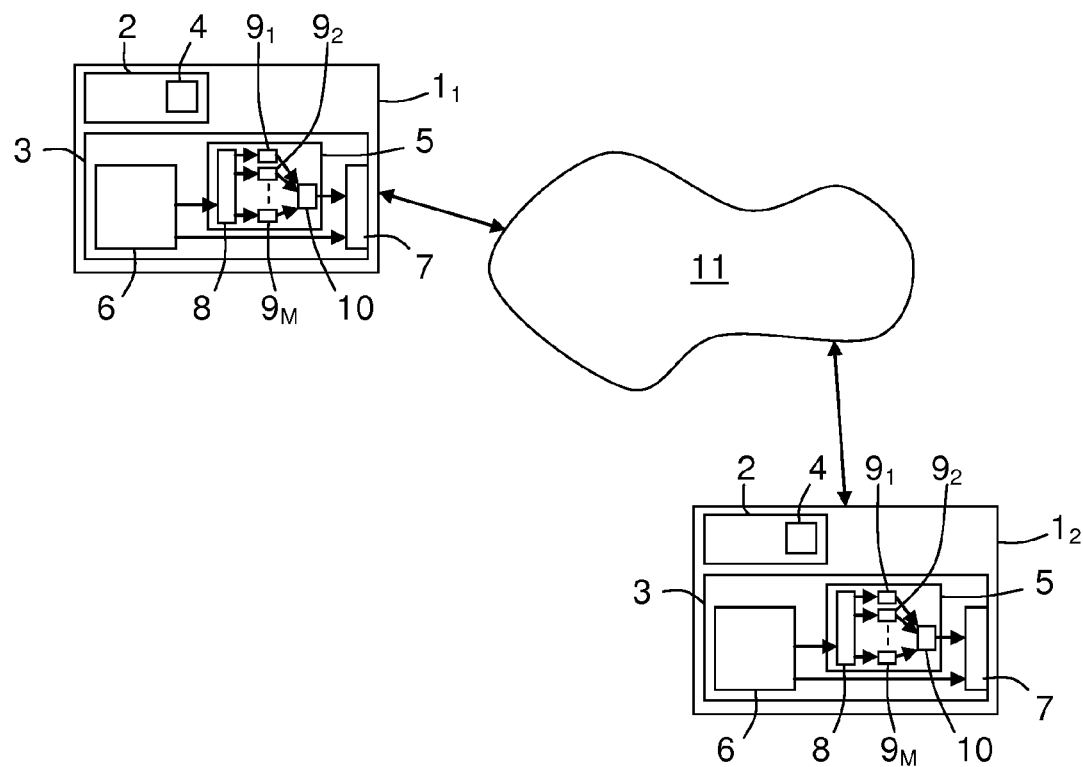
FIG. 1 schematically and functionally illustrates two transceivers comprising examples of embodiment of first and second devices according to the invention and connected to a communication network, FIG. 2 schematically illustrates in a diagram a first example of temporal evolution of a transceiver data rate during a data rate change involving a single auxiliary data rate, FIG. 3 schematically illustrates in a diagram a second example of temporal evolution of a transceiver data rate during a data rate change involving a single auxiliary data rate, FIG. 4 schematically illustrates in a diagram a third example of temporal evolution of a transceiver data rate during a data rate change involving two different auxiliary data rates, and FIG. 5 schematically illustrates in a diagram a fourth example of temporal evolution of a transceiver data rate during a data rate change involving two different auxiliary data rates.

In the following description, and as illustrated in FIG. 1, it will be considered that the transmitter 2 and the receiver 3, that are involved in a signal transmission, equip respectively first $1_1$ and second $1_2$ transceivers that are both connected to a communication network 11 (whatever its type (wired or wireless)). But they could be part of any other type of electronic equipment providing a bidirectional or monodirectional communication function.

So, and as illustrated in FIG. 1, each transceiver $1_i$ (i=1 or 2) comprises a transmitter 2 and a receiver 3.

Each transmitter 2 comprises DSP software blocks (not illustrated) that are arranged for producing signals with a chosen modulation format, a chosen coding rate and a chosen symbol rate, and is capable of emitting these produced signals into the communication network 11.

Each receiver 3 is capable of receiving signals transmitted via the communication network 11, and comprises first 6 and second 7 groups of DSP software blocks that are arranged for processing these received signals depending on their chosen modulation format, chosen coding rate and chosen symbol rate. The first group of DSP software blocks 6 is arranged for performing a chromatic dispersion estimation, a clock recovery, polarization demultiplexing and equalization and carrier frequency and carrier phase estimations. The second group of DSP software blocks 7 is arranged for performing a detection of signal symbols and decoding.

As mentioned before, the invention proposes notably a method intended for controlling transmission of a signal between a transmitter 2 (here of a first transceiver $1_1$) and a receiver 3 (here of a second transceiver $1_2$) during a phase of change of signal data rate.

This method comprises first, second and third steps.

A first step of this method is initiated at an instant t1 when a data rate change of a signal is requested during its transmission at a first data rate $R_1$. The request of a data rate change is made by the control plane and aims at informing the transmitter 2 and the receiver 3 about its decision. The control plane may rely on a local controller to trigger the change.

During this first step the transmitter 2 of the signal (concerned by the requested change) and the receiver 3 of this signal are informed of a start of a transition phase at an instant t2. The transmission of this information at t2 is triggered by a local controller or directly by the control plane.

One means here by "transition phase", the time duration that a transmitter 2 or a receiver 3 needs to reach a good convergence with a stable BER performance during a change phase. Such a time duration depends on the type of the requested change.

This information may be transmitted by means of a dedicated message or a message that is used for another purpose and notably to inform the change of modulation format and/or channel coding and/or symbol rate and/or the number of (sub)-carriers in a multi-carrier transmission.

The time difference δ (see FIGS. 2 and 4) or δ+Δ (see FIGS. 3 and 5) between instants t2 and t1 is preferably predefined. It corresponds at least to a first guard time interval (δ) that is required for both transmitter 2 and receiver 3 to activate their respective first 4 and second 5 devices (described below) to be ready to transmit or receive during the transition phase. The definition of Δ is given below. So, an information representative of a start of a transition phase is transmitted to both transmitter 2 and receiver 3 once a predefined guard time interval has passed after they received a corresponding change request.

In the second step of the method the transmitter 2 of the signal retransmits the signal N times, with N≥1, in identical signal parts $s_n$ (n=1 to N) having a chosen length L, and the concerned receiver 3 stores these N retransmitted identical signal parts $s_n$ successively received to combine them together to produce a combined signal part S. So, this receiver 3 outputs temporarily combined signal parts S with an auxiliary data rate $R_a$ that depends on N and on the signal part length L.

It is important to note that the signal parts $s_n$ of length L may be defined at the symbol level or at the bit level, depending on the chosen implementation.

For instance, N may be equal to 1 or 2, and L may be equal to 40% or 50% of the codeword length. But other values may be chosen depending on the context and/or on the wished BER performance during the transition phase. Generally speaking, the BER performance increases substantially when the number N of retransmissions increases and/or the signal part length L increases, but in return this decreases the auxiliary data rate $R_a$.

This second step may be implemented by a first device 4 that equips the transmitter 2 and by a second device 5 that equips the receiver 3. These first 4 and second 5 devices are activated respectively by the transmitter 2 and the receiver 3 during the above mentioned guard time interval δ or δ+Δ (i.e. between t1 and t2).

The first device 4 is arranged, after having been activated by its transmitter 2, for reproducing the signal to be transmitted N times, with N≥1, in identical signal parts $s_n$ having a chosen length L, so that these N identical signal parts $s_n$ be successively transmitted by its transmitter 2 to the concerned receiver 3 to be combined together to produce a combined signal part S, and to temporarily outputs the combined signal parts S with an auxiliary data rate $R_a$ depending on N and on the signal part length L.

Such a first device 4 is preferably made of software modules, at least partly, that act at the symbol level or bit level, depending on the chosen implementation. But it could be also made of a combination of hardware and software modules acting at the symbol level or bit level by means of FPGA or ASIC for instance. In case where it is made of software modules it can be stored in a memory, possibly after having been downloaded, or in any computer software product.

The second device 5 is arranged, after having been activated by its receiver 3, for storing the N retransmitted identical signal parts $s_n$ of the signal (produced by the transmitter 2 and successively received by its receiver 3), to combine them together to produce a combined signal part S, in order to temporarily output combined signal parts S with an auxiliary data rate $R_a$ depending on N and on the signal part length L.

Such a second device 5 is preferably made of software modules, at least partly, that act at the symbol level or bit level, depending on the chosen implementation. But it could be also made of a combination of hardware and software modules acting at the symbol level or bit level by means of FPGA or ASIC for instance. In case where it is made of software modules it can be stored in a memory, possibly after having been downloaded, or in any computer software product.

The symbol-level implementation is less complex than the bit-level implementation since the retransmitted identical signal parts $s_n$ do not need to be decoded before being combined.

For instance, and as illustrated in FIG. 1, each second device 5 may comprise a first functional module 8, M second functional modules $9_m$ (with m=1 to M and M at least equal to the maximum value that N can take), and a third functional module 10. The M second functional modules $9_m$ define M buffers in N of which the N identical signal parts $s_n$, successively retransmitted and received, are temporarily stored before being combined. The first functional module 8 defines a switch arranged for switching the N identical signal parts $s_n$ it receives successively into the N buffers $9_1$ to $9_N$. The third functional module 10 defines a combiner arranged for combining the N identical signal parts $s_n$ temporarily stored into the N buffers $9_1$ to $9_N$ to produce a combined signal part S, with an auxiliary data rate $R_a$ depending on N and on the signal part length L, that feeds the second group of DSP software blocks 7.

For instance, the combiner 10 may be arranged for multiplying each retransmitted identical signal part $s_n$ with a weighting coefficient $w_n$, representative of a level of confidence of its retransmission, to generate a weighted signal part $w_n*s_n$, and these N weighted identical signal parts $w_n*s_n$ are added together to produce a combined signal part S defined by:

$$S = \sum_{n=1}^{N} w_n * s_n$$

The weighting coefficient $w_n$ may depend from the context. For instance, the last retransmission of $s_3$ may be more reliable than the initial retransmission of $s_j$ since the updated algorithm(s) may have converged.

In the third step of the method the transmitter 2 and the receiver 3 are informed of the end of the transition phase when the signal data rate change is finished (instant t3). The transmission of this information at t3 is triggered by a local controller or directly by the control plane.

This information may be transmitted by means of a dedicated message or a message that is used for another purpose and notably to inform the transmitter 2 and receiver 3 of stable BER performance, hence the first 4 and second 5 devices can be deactivated.

Once the transmitter 2 and the receiver 3 have been informed of the end of the transition phase (at t3) their respective DSP software blocks have been fully updated and therefore are ready to pursue the signal transmission or reception at a final (second) data rate $R_2$ (that may be greater or smaller than the first (or initial) data rate $R_1$).

Figure 2:
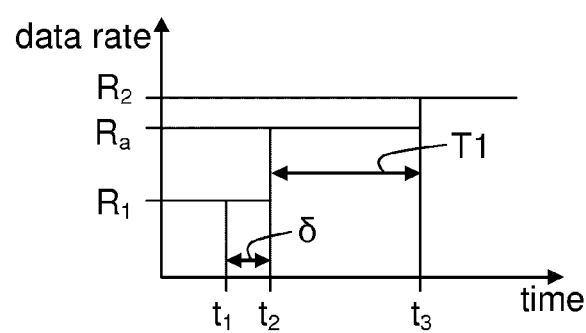
Figure 3:
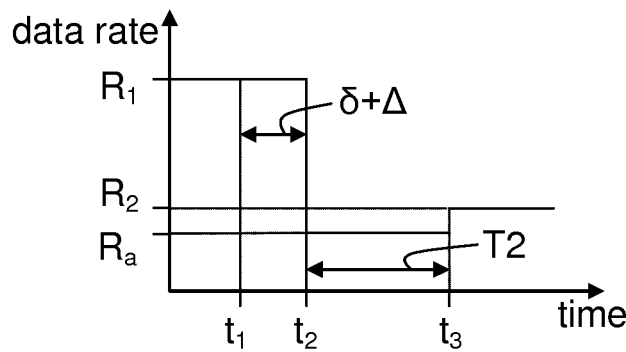

Two examples of a data rate change involving a single auxiliary data rate $R_a$ are illustrated in the diagrams of FIGS. 2 and 3.

The diagram of FIG. 2 corresponds to a non-limitative case where the signal data rate change consists in changing the first data rate $R_1$ with a second data rate $R_2$ that is greater than the first data rate $R_1$ (i.e. $R_2 > R_1$) during the transition phase that occurs between instants t2 and t3 (T1=t3−t2). In this case, the auxiliary data rate $R_a$ is comprised between the first $R_1$ and second $R_2$ data rates (but such a choice is not mandatory). After t3 the transition phase is finished and therefore the second data rate $R_2$ is guaranteed.

It is important to note that in the above described example the auxiliary data rate $R_a$ may be equal to the first data rate $R_1$ in order to reduce the number of times the IP router or OTN switch (which delivers incoming flows to the transceiver 1) needs to switch from a data rate to another data rate.

The diagram of FIG. 3 corresponds to a case where the signal data rate change consists in changing the first data rate $R_1$ with a second data rate $R_2$ that is smaller than the first data rate $R_1$ (i.e. $R_2 < R_1$) during the transition phase that occurs between instants t2 and t3 (T1=t3−t2). In this case, the auxiliary data rate $R_a$ is smaller than the second data rate $R_2$ (because during transition period there are N re-transmissions of length L). After t3 the transition phase is finished and therefore the second data rate $R_2$ is guaranteed. In the example of FIG. 3, the time difference between instants t2 and t1 comprises the first guard time interval δ and a second guard time interval Δ that corresponds to the case where one desires to send data at the second data rate $R_2$ to maintain an average data rate that is larger than or equal to the lower data rate $R_2$ during the time interval Δ+T2 (if one wants an average data rate superior (or equal to) $R_2$ during the time interval [t1, t3], then one could transmit during more time (Δ) at the highest rate R1 to ensure this). It is important to note that the second guard time interval Δ could be equal to zero or very near from zero.

In these two examples, the data rate change involves only a single auxiliary data rate $R_a$. But, in a variant the data rate change could involve at least two auxiliary data rates $R_{aj}$. In this case, during the second step the transition phase is divided into j (with j at least equal to two) successive sub phases $SP_j$. During each sub phase $SP_j$ the transmitter 2 retransmits the signal $N_j$ times, with $N_j \geq 1$, in signal parts $s_{nj}$ having a chosen length $L_j$, and the receiver 3 stores the $N_j$ retransmitted identical signal parts $s_{nj}$ successively received to combine them together to produce a combined signal part $S_j$, in order to temporarily output the combined signal parts $S_j$ with an auxiliary data rate $R_{aj}$ depending on $N_j$ and on the signal part length $L_j$. $R_{aj}$ may be greater than $R_{aj-1}$ or smaller than $R_{aj-1}$ (notably when the BER is too bad during the first sub phase SP1).

Figure 4:
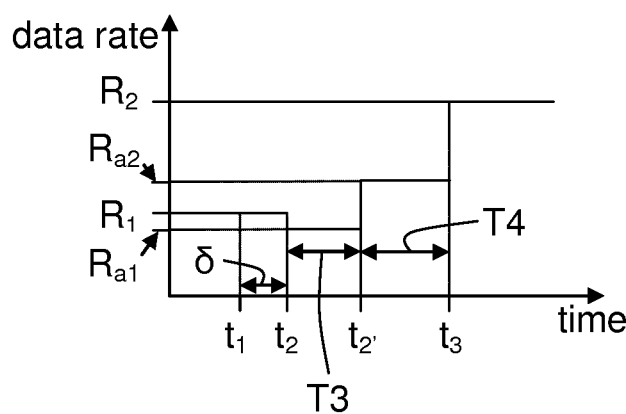
Figure 5:
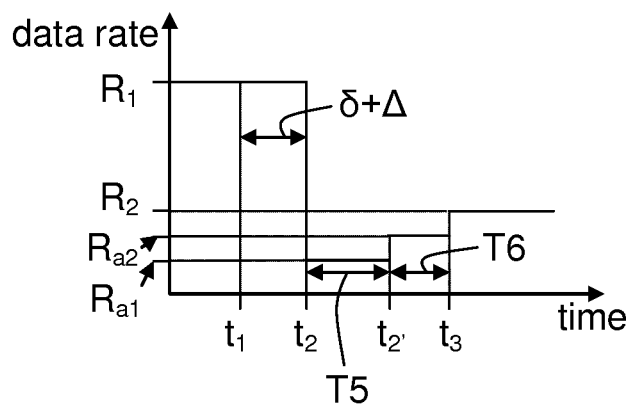

Two examples of a data rate change involving two auxiliary data rates $R_{a1}$ and $R_{a2}$ are illustrated in the diagrams of FIGS. 4 and 5.

The diagram of FIG. 4 corresponds to a non-limitative case where the signal data rate change consists in changing the first data rate $R_1$ with a second data rate $R_2$ that is greater than the first data rate $R_1$ (i.e. $R_2 > R_1$) during the transition phase that occurs between instants t2 and t3. In this case, a first auxiliary data rate $R_{a1}$ is used during a first sub phase $SP_1$ that occurs between instants t2 and t2' (T3=t2'−t2), and a second auxiliary data rate $R_{a2}$ (greater than $R_{a1}$) is used during a second sub phase $SP_2$ that occurs between instants t2' and t3 (T4=t3−t2'). In this non-limitative example the first auxiliary data rate $R_{a1}$ is smaller than the first data rate $R_1$ (but such a choice is not mandatory). Also in this non-limitative example the second auxiliary data rate $R_{a2}$ is comprised between the first $R_1$ and second $R_2$ data rates (but such a choice is not mandatory). After t3 the transition phase is finished and therefore the second data rate $R_2$ is guaranteed.

The diagram of FIG. 5 corresponds to a case where the signal data rate change consists in changing the first data rate $R_1$ with a second data rate $R_2$ that is smaller than the first data rate $R_1$ (i.e. $R_2<R_1$) during the transition phase that occurs between instants t2 and t3. In this case, a first auxiliary data rate $R_{a1}$ is used during a first sub phase $SP_1$ that occurs between instants t2 and t2' (T3=t2'−t2), and a second auxiliary data rate $R_{a2}$ (greater than $R_{a1}$) is used during a second sub phase $SP_2$ that occurs between instants t2' and t3 (T4=t3−t2'). The first $R_{a1}$ and second $R_{a2}$ auxiliary data rates are smaller than the second data rate $R_2$ (because during transition period there are N re-transmissions of length L). The different auxiliary data rates $R_{aj}$ are obtained by varying the number $N_j$ of retransmissions and/or the length $L_j$ of the retransmitted identical signal parts $s_{nj}$. After t3 the transition phase is finished and therefore the second data rate $R_2$ is guaranteed.

The invention allows transceivers to switch from one data rate to another without any traffic disruption and without any need of re-routing traffic through additional transceiver devices. This allows to design a hitless transceiver with low margins to provide the maximum achievable capacity at any time.

The functions of the various elements shown in the figures may be provided through the use of dedicated hardware as well as hardware capable of executing software in association with appropriate software.

It should be appreciated by those skilled in the art that any block diagrams herein represent conceptual views of illustrative circuitry embodying the principles of the invention.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method for controlling transmission of a signal between a transmitter and a receiver during a phase of change of a signal data rate, said method comprising:
   when said change is requested, informing said transmitter and said receiver of a start of a transition phase, wherein said transmitter and said receiver are informed of the start of the transition phase once a guard time interval has passed after said transmitter and said receiver receive a corresponding change request;
   retransmitting, at said transmitter, said signal N times, with N≥1, in identical signal parts having a chosen length;
   storing, at said receiver, said N retransmitted identical signal parts successively received to combine them together to produce a combined signal part, and temporarily outputting said combined signal parts with an auxiliary data rate depending on N and on said signal part length; and
   informing said transmitter and said receiver of an end of said transition phase when said signal data rate change is finished.

2. The method according to claim 1, wherein each one of said N retransmitted identical signal parts is multiplied with a weighting coefficient, representative of a level of confidence of its retransmission, to generate a weighted signal part, and N weighted identical signal parts are added together to produce said combined signal part.

3. The method according to claim 1, wherein said transition phase is divided into j successive sub phases during each of which said transmitter retransmits said signal $N_j$ times, with $N_j \geq 1$ and with j at least equal to two, in identical signal parts having a chosen length, and said receiver stores said $N_j$ retransmitted identical signal parts successively received to combine them together to produce a combined signal part, to temporarily output said combined signal parts with an auxiliary data rate depending on $N_j$ and on said signal part length.

4. The method according to claim 1, wherein in the case where the signal data rate change consists in changing a first data rate with a second data rate greater than said first data rate, said auxiliary data rate is comprised between said first and second data rates.

5. The method according to claim 1, wherein in the case where the signal data rate change consists in changing a first data rate with a second data rate smaller than said first data rate, said auxiliary data rate is smaller than said second data rate.

6. The method according to claim 1, wherein said transmitter and said receiver are connected to a wired or a wireless communication network.

7. A transmitter comprising a device, said device being arranged, after having been activated following a requested change of a signal data rate during a transmission of a signal by said transmitter to a receiver, to be informed of a start of a transition phase once a guard time interval has passed after said transmitter and said receiver receive a corresponding change request, to reproduce said signal N times, with N≥1, in identical signal parts having a chosen length, so that these N identical signal parts be successively transmitted by said transmitter to said receiver to be combined together to produce a combined signal part, and to temporarily output said combined signal parts with an auxiliary data rate depending on N and on said signal part length, and to be informed of an end of said transition phase when said signal data change is finished.

8. A transceiver comprising:
   a transmitter comprising a device according to claim 7; and
   a receiver comprising a device arranged, after having been activated following a requested change of a signal data rate during a transmission of a signal by said transmitter to said receiver, to be informed of a start of a transition phase, to store N retransmitted identical signal parts of said signal, having a chosen length and successively received by said receiver, to combine them together to produce a combined signal part, and to temporarily output said combined signal parts with an auxiliary data rate depending on N and on said signal part length.

9. A receiver comprising a device, said device being arranged, after having been activated following a requested change of a signal data rate during a transmission of a signal by a transmitter to said receiver, to be informed of a start of a transition phase once a guard time interval has passed after said transmitter and said receiver receive a corresponding change request, to store N retransmitted identical signal parts of said signal, having a chosen length and successively received by said receiver, to combine them together to produce a combined signal part, and to temporarily output said combined signal parts with an auxiliary data rate depending on N and on said signal part length, and to be informed of an end of said transition phase when said signal data change is finished.

\* \* \* \* \*